June 24, 1958    H. C. SCHLOER    2,839,852
SPRING BIASED SELF-OPENING GATE
Filed April 4, 1955    2 Sheets-Sheet 1

INVENTOR.
HENRY C. SCHLOER
BY
ATTORNEY

June 24, 1958 H. C. SCHLOER 2,839,852
SPRING BIASED SELF-OPENING GATE
Filed April 4, 1955 2 Sheets-Sheet 2
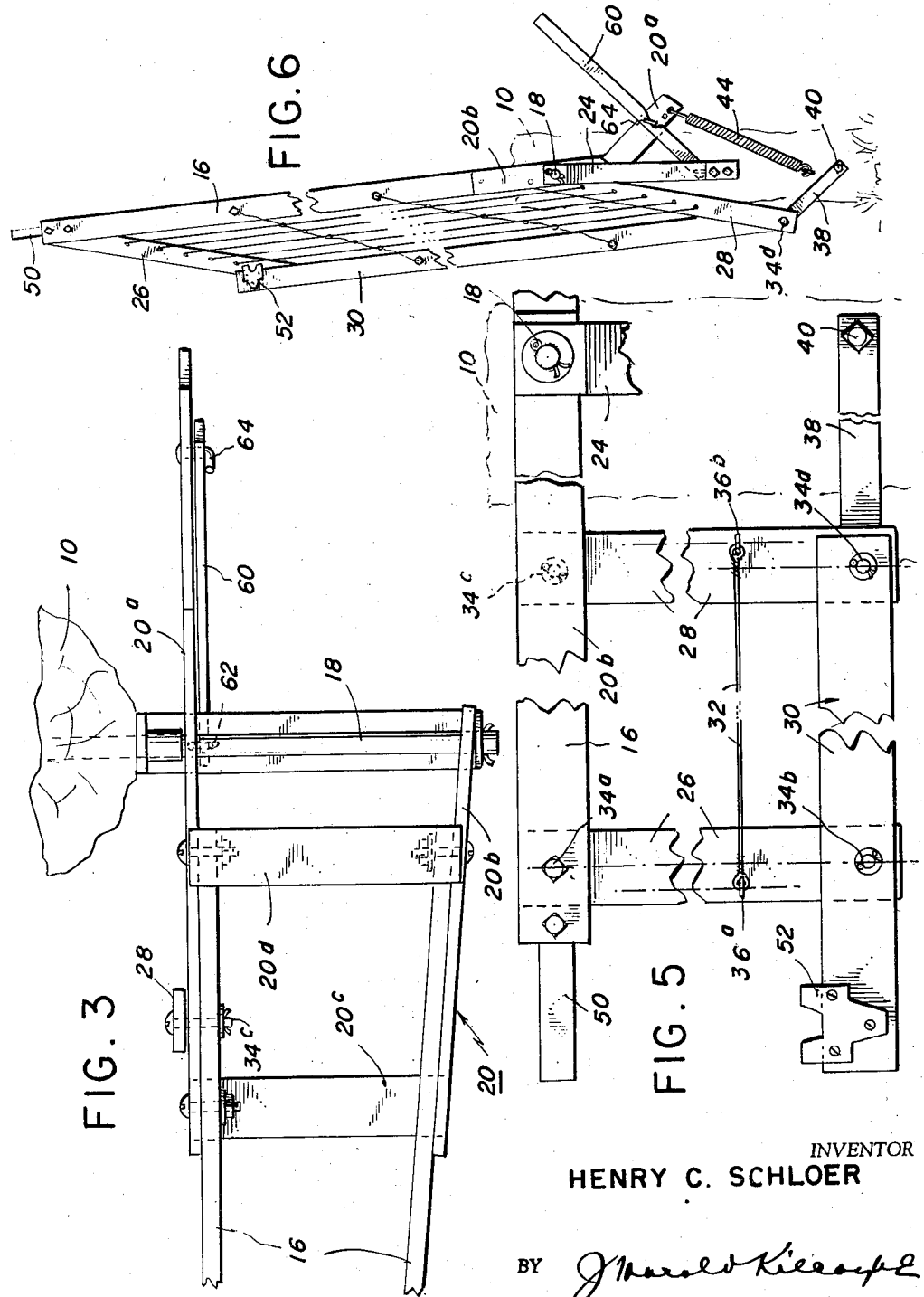
INVENTOR
HENRY C. SCHLOER
BY 
ATTORNEY

2,839,852
SPRING BIASED SELF-OPENING GATE

Henry C. Schloer, Greene, N. Y.

Application April 4, 1955, Serial No. 498,938

10 Claims. (Cl. 39—43)

This invention relates to improvements in gates and more particularly to an improved roadway or farm gate for use in enclosing private estates, farms, fields, institutional properties and the like.

Present gates for use as aforesaid are mainly of the rigid, horizontally swinging type which, as is well known, require an excessive amount of clearance space for their free opening and closing movement, as well as a level grade in the area over which the gate moves. Horizontally swinging gates also require removal of snow during the winter months and cutting of grass and weeds during the growing season from the aforesaid clearance space. In addition, the larger sizes of farm gates are usually of heavy construction to prevent sagging, and hence can be opened and closed only by applying substantial force thereto.

Numerous efforts towards devising a satisfactory vertically operating gate overcoming the above-noted disadvantages of the horizontally swinging gate have been recorded. However, such have not been successful, with the result that use of the latter as the lesser of two evils has largely persisted up to the present time.

Generally stated, a major object of the present invention is the provision of a practical and thoroughly dependable farm gate of the vertically operating type which overcomes the noted objections to and drawbacks of the present horizontally swinging gates.

Another important object of the present invention is the provision of a vertically operating gate which satisfies the manifold exacting requirements of an effective farm gate, while at the same time being characterized by simplicity of design and manufacture, inexpensive construction and ease of maintenance.

More particularly, an object of the invention is the provision of an improved design and construction of vertically operating gate, which enables the gate to swing vertically in its plane to a substantially vertical position, and in so doing to fold to a small lateral dimension, whereby it imposes the minimum of obstruction to the gate opening.

A further object of the invention is the provision of a vertically operating gate utilizing a novel arrangement of spring means capable not only of counterweighting the gate but also of controllably biasing it to open position so that it may be easily opened, without however detracting in any substantial manner from the ease with which it may be actuated from open to closed position.

Yet another object of the invention is the provision of a farm gate employing barrier means of exceedingly effective yet light-weight construction per unit of width, thereby reducing if not overcoming completely the tendency of even the wider gates to sag and making them comparatively easy to operate.

A still further object of the invention is the provision of an improved design of vertically operating farm or roadway gate which features a vertically swinging cantilever serving as the gate's main structural member, and suspended therefrom and extending substantially to ground level, a collapsible, light-weight apron whose movement to and from collapsed condition is effectively controlled.

The above and other objects and features of improvement of a roadway or farm gate according to the invention will appear from the following detailed description thereof, reference being had to the accompanying drawings illustrating the various structural features thereof, in which:

Fig. 3 is an enlarged top view of approximately that portion of the gate structure shown in Fig. 2;

Fig. 5 is an enlarged broken-away view illustrating the preferred offsetting of the pivoting points of the horizontal intermediate components of the gate member from the pivoting points of the gate top, bottom and end members; and Fig. 6 is a broken-away view illustrating the gate in its full-raised position.

Figure 1:
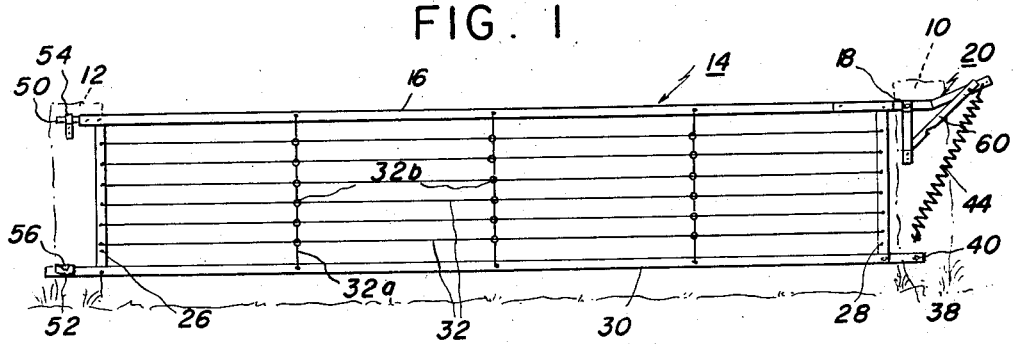
Fig. 1 is a front elevation of the improved vertically operating gate according to the present invention in its lower or closed position.

Referring to the drawings, a gate according to the invention is intended to perform the usual function of a roadway or farm gate in providing a barrier or closure for an opening in a fence or the like as defined by two spaced gate posts 10 and 12, of which for convenience the post 10 will be hereinafter referred to as the supporting post and the post 12 as the latch post. The gate proper is generally designated 14 and comprises a main or top member consisting of a cantilever beam 16 of length as to extend between said posts, said cantilever being pivotally connected at one end to the supporting post 10 by means of a horizontal pivot shaft 18 which extends forwardly from said post and is disposed a distance above ground level which corresponds generally to the desired vertical height of the gate. Accordingly, the cantilever 16 is adapted to swing in a vertical plane located just forwardly of the supporting post 10 and of the latch post 12 as well, since the latter may be considered as being contained in the same vertical plane as said supporting post.

Figure 2:
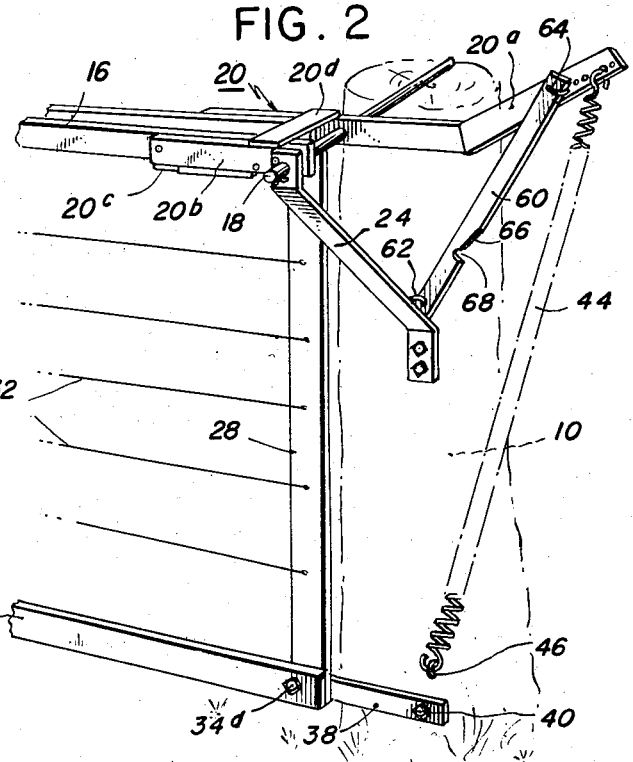
Fig. 2 is an enlarged broken-away perspective view of the pivotally supported end of the gate shown in Fig. 1.

As best seen in Figs. 2 and 3, the pivot shaft 18, rather than having bearing directly in the end of the cantilever 16, instead has bearing in the spaced arms 20a, 20b of an extension member preferably in the form of a steel saddle member 20 into which the pivoting end of the cantilever is fitted and to which it is rigidly affixed as by bolts. Illustratively, the saddle member includes cross straps 20c, 20d (Fig. 3) which are so connected and positioned as to provide the saddle member with the requisite great strength and rigidity.

As also seen in Fig. 3, the pivot shaft 18 extends through the saddle intermediate its ends and has length such that it may extend completely through the supporting post 10, being affixed thereto so that one extended end thereof projects forwardly from the post, so as to permit mounting of the cantilever thereon as aforesaid. Preferably, the outer or free end of said shaft is supported by an inclined brace 24 whose lower end is rigidly affixed to the supporting post 10. By this arrangement, a portion of the load taken by the pivot shaft is transposed by the brace 24 to a low point on the supporting post 10.

According to the invention, the cantilever 16 supports a light weight, foldable apron illustratively comprising two horizontally spaced vertical end stays 26, 28, a bottom horizontal member 30 and a plurality of intermediate horizontal components designated 32. By reference to Fig. 5, it will be seen that the vertical end stays 26, 28 pivotally connect to the ends of the cantilever 16 and the bottom horizontal member 30, respectively, by means of pivot bolts designated 34a, 34b, 34c, 34d, of which pivot bolts 34a, 34b are preferably disposed on the vertical center line of the end stay 26 and pivot bolts 34c, 34d are similarly disposed on the vertical center line of the end stay 28. However, the J-bolts 36a, 36b or other means employed for fastening the intermediate horizontal components 32 of the apron are offset outwardly from the vertical center lines of said end stays 26, 28 by a small distance. By this principle of location, it has been found that the apron may fold against the cantilever 16 in the manner of a parallel linkage mechanism, upon the latter being swung to approximately vertical position.

In addition to the intermediate horizontal components 32 of the apron, the latter also preferably includes intermediate vertical stays 32a designed to support intermediate their ends yet permit free motion of said intermediate horizontal components. To this end, the intermediate verticals 32a are provided with circular loops 32b or equivalent structure at the locations of their intersection with the intermediate horizontals 32, said loops providing complete freedom of motion of said horizontal components with respect to the vertical components.

While the intermediate horizontals 32 are shown to be made of smooth wire, they may also be made of barbed wire, slats, rods, tubing or the like, and this is true also for the intermediate vertical components 32a of the apron. These components may of course be constructed from materials corresponding to or simulating the material or materials of the fence with which the gate is used. In general then, the particular construction of the apron is not critical, so long as it provides an effective dependent barrier extending from cantilever to substantially ground level, as well as one which is light in weight and capable of being easily and readily folded in the manner of a parallel linkage mechanism as aforesaid.

To control the aforesaid folding action of the apron portion of the gate, and also to prevent the bottom rear portion of the apron from swinging or being pushed out of the vertical plane of the cantilever 16, there is provided an apron control link 38 extending between the supporting post 10 and the rear lower corner of the gate. Preferably, this link is pivotally connected to the bottom member 30 of the gate so as to extend outwardly therefrom (toward the supporting post 10) by the aforesaid pivot bolt 34d and it is also pivotally and loosely fastened to the supporting post 10 by means of a bolt 40 disposed substantially on the horizontal line of said pivot bolt 34d and on the vertical line of the pivot shaft 18.

According to a further feature of the invention, the gate is counterweighted and its opening movement assisted by spring means operative between the saddle 20 and the supporting post 10. Illustratively, such spring means comprises an elongated coiled tension spring 44 extending and reactive between the free end of the arm 20a of the saddle 20 and a low point on the supporting post 12, as defined by a fastening eye 46 disposed adjacent the pivot bolt 40. It will be noted that said arm 20a is formed long as compared to its companion saddle arm 20b, being moreover offset upwardly so as to provide a measure of compensation for the contraction of the spring 44 during raising of the gate, and also that the spring is connected to the extreme end of said arm 20a. Hence, the point of connection between spring 44 and saddle arm 20a is located a substantial distance to the side of the pivot shaft 18 opposite the gate opening. It follows that by a proper choice of spring tension, the spring 44 may serve not only to counterweight the gate, but also to assist in raising of said gate to its open position. The aforesaid point of connection of spring to saddle arm is further rendered variable by providing the end of said arm with a plurality (three being illustrated) of spring attaching holes.

Figure 4:
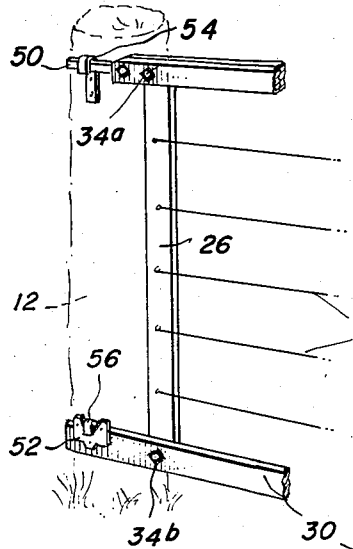
Fig. 4 is a view similar to Fig. 2 but illustrating the opening or free end of the gate shown in Fig. 1.

Preferably, the gate is maintained closed against the energy stored in the spring 44 by cooperating hold-down and latching means provided at the free end of the gate and on the latch post 12. Referring to Fig. 4, such means includes a latch bar 50 secured to and projecting from the free end of the cantilever 16, and a combined latch and locating plate 52 carried by the extended free end of the bottom horizontal member 30 of the apron. The latch bar 50 is adapted to engage with an upper keeper 54, shown to be in the form of a downwardly opening strap hook which is rigidly affixed to the latch post 12 in position to receive said bar, and the combined latch and locating plate 52 is adapted to engage with lower keeper 56, illustratively a hook-like member generally similar to the aforesaid upper keeper hook 54. Preferably, the upper edge of the latch and locating plate 52 is formed with an upwardly opening, generally V-shaped notch which centers the hook-member 56 therein and thereby "locates" the apron laterally and vertically and stabilizes it laterally.

A still further feature of the invention resides in the means for detachably securing the gate in raised position. Illustratively, such means comprises a locking lever 60 which may be pivotally connected to the lower portion of the brace 24, and hence to the supporting post 10 at a point intermediate the pivot shaft 18 and pivot bolt 40 as by means of an eye 62 affixed on said brace on its inner face and near its lower end, so that the lever operates in a vertical plane disposed slightly forwardly of the saddle arm 20a. As best seen in Fig. 2, the upper end of the locking lever leans on an L-shaped pin 64 which projects forwardly from the front vertical face of the saddle arm 20a. Near its middle portion, the under edge of said locking lever 60 is formed with an incline 66 leading to a U-shaped notch 68 formed in said edge and which is angled slightly upwardly-rearwardly as shown. The notch 68 is so located with respect to the locking pin 64 that, upon said saddle arm 20a swinging through a lowering arc of slightly less than 90° (approximately 88°) responsively to the cantilever 16 swinging through a corresponding ascending arc, the locking pin 64 enters the notch 68 wherein it is normally held both by the aforesaid inclination of the notch and the tendency of the locking lever 60 to lean in clockwise direction under the force of gravity. However, this locking effect may be simply broken merely by slightly lifting the free end of the locking lever 60 and simultaneously therewith exerting a slight downward pressure on the cantilever 16, as results in the saddle arm 20a raising the amount necessary to disengage the locking pin 64 from the notch 68. When such has been effected, the gate may be lowered without any interference by said locking arm and its coacting locking pin 64.

Normally, the gate is held in its closed position against the counterweighting and lifting force stored in the spring 44, consequent to the latch bar 50 and the latch and locating plate 52 being engaged beneath the keeper hooks 54, 56. To raise the gate, it is necessary only either to press down on the free end of the cantilever 16 or to apply foot pressure on the corresponding end of the bottom horizontal member 30 of the gate apron and simultaneously pull the gate forwardly the small amount necessary for said latch parts 50, 52 to clear the aforesaid keeper hooks 54, 56, whereupon the gate tends to swing upwardly to its open position as illustrated in Fig. 6, in response to the energy stored in the spring 44. Consequent to this swinging movement, the center of gravity of the gate lowers, with the result that the force required to open same decreases by an amount substantially equalling the decreasing force stored in the spring; that is to say, the assisting action of the spring 44 is present throughout the full opening movement of the gate, despite the fact that the force of the spring diminishes progressively during such movement.

Upon the gate moving to its full open position as generally indicated in Fig. 6, it is positively held in that position against further opening movement, and against uncontrolled lowering movement as well, by engagement of the locking pin 64 in the notch 68 of the locking lever 60. However, when it is desired to lower the gate, such locking action may be simply broken by slightly raising the locking lever 60 whereupon the gate may be swung to full lowered position, as determined by engagement of the latch bar 50 and latch plate 52 beneath their keeper hooks 52, 56, respectively.

During the opening and closing movement of the gate as aforesaid, the apron portion of the gate folds or collapses against the cantilever 16 in the manner of a parallel linkage mechanism, so that the lateral dimension of the raised gate is very small. This free folding motion is made possible by the unique construction of the apron as explained above, taken with the control action exerted on the apron by the link 38.

While the illustrated cantilever 16 has been shown to consist of fabricated wooden members, i. e. boards permanently assembled into a cantilever beam, other cantilever construction and sections may be substituted, provided of course that they are properly designed to withstand wind pressures of approximately seventy miles per hour, and to support at the beam mid-point a two hundred lb. live load, together with the weight of the apron portion of the gate. Accordingly, instead of the illustrated cantilever construction and section, such may be formed of tubular members which taper or have diameter which decreases in steps towards its free end; or it may consist of a single extruded beam of rectangular, tubular or other suitable cross-section; or it may consist of two oppositely disposed channel sections spot-welded or riveted together, all as well known in cantilever beam construction.

A notable feature of the invention is the manner of mounting the cantilever through a saddle member to a pivot shaft as described. This mounting method not only securely anchors the gate, but also it provides that pressure or pull applied to either side of the gate results in pressure applied directly against the post or in direct pull from the post, without straining the gate mount in any prejudicial manner.

Another features of practical importance resides in the arrangement and disposition of the spring 44, according to which it has substantial linear dimension, which fact contributes to its minimum value of tension being kept as near its maximum tension as is feasible. This desirable feature is of course made physically possible, at least in part, by the illustrated mounting of the spring 44 between the extended end of saddle arm 20a and a low point on the supporting post 10. Maximum spring tension, and hence rate of opening of the gate, is subject to adjustment through the provision of the three points of spring-to-saddle arm connection as aforesaid.

Another noteworthy feature is in the simple and lightweight construction of the apron, and the manner in which it folds to a compact lateral dimension upon raising or opening of the gate. The provision of the link 38 between apron rear bottom corner and supporting post 10 also deserves mention because it effects substantial control of the apron, both in the closed position of the gate and during its raising and closing movement. More particularly, the link 38 positively ties down the rear end of the apron when the gate is closed; its arrangement assures freedom of motion to the apron; it assists in the positive collapse or folding of the apron during gate opening; and finally it assists in the positive opening of the apron.

Finally, the means for latching the gate in closed position against the force of the spring 44 tending to open the gate represents features of advantage. Such follows from the fact that the latching action takes place automatically upon properly relating the gate-carried latch members with the latch-post keeper members. Such latching action when effected also means that the apron portion of the gate is both located laterally and vertically as intended and also that it is stabilized laterally by being held along its bottom line between the bolt 40 and the lower keeper 56.

As many changes could be made in carrying out the above constructions without departing from the scope of the invention, it is intended that all matter contained in the above description or shown in the accompanying drawings shall be interpreted as illustrative and not in a limiting sense.

I claim:

1. A vertically swinging-type gate of substantially parallelogram shape having top and bottom members and pivotally-connected interconnecting members adjacent the ends of said top and bottom members, a control-link member pivotally connected at one end to one end of said bottom member and having a pivot means adjacent its other end, an extension member rigidly connected to said top member and being disposed generally above said link member and having a gate-pivot means intermediate its ends and at substantially the same distance from said gate as said link-member pivot means, spring means for raising the gate connected to said extension member adjacent its outer end and adapted to be anchored adjacent said link-member pivot means, and a locking means for locking the gate in raised position and being operatively associated with said extension member and adapted to be anchored intermediate said link-member pivot means and said gate-pivot means.

2. A vertically swinging-type gate substantially as set forth in claim 1, wherein said locking means includes a locking pin projecting from the extension member intermediate the gate-pivot means and the outer end of said extension member, and a locking lever whose lower end is anchored intermediate said link-member pivot means and said gate-pivot means as aforesaid and whose upper end extends outwardly and coacts with said locking pin to lock the gate in a predetermined raised position.

3. A vertically swinging-type gate substantially as set forth in claim 2, wherein said locking lever is arranged on edge and normally leans on said locking pin and is provided on its under edge with a locking-pin receiving notch located so as to lockingly receive the locking pin responsively to the gate being raised to said predetermined raised position.

4. A vertically swinging-type gate substantially as set forth in claim 1, wherein the outer end of the extension member to which the spring means is connected is upwardly inclined thereby to increase the length of the spring means.

5. In a vertically swinging-type gate, the combination of spaced vertical members defining a gate opening, one of said members comprising a gate-supporting member, a gate of substantially parallelogram shape extending between said vertical members and having top and bottom members and pivotally-connected interconnecting members adjacent the ends of said top and bottom members, an extension member rigidly connected to one end of said top member and having a gate-pivot means intermediate its ends which is anchored to said gate-supporting member at approximately the upper line of the gate, a control-link member pivotally connected at one end to the end of said bottom member adjacent said gate-supporting member and having pivot means at its other end anchoring it to said gate-supporting member below and in substantially vertical alignment with said gate-pivot means, spring means connected at its upper end to said extension member adjacent the outer end of the latter and anchored at its lower end to said gate-supporting member at a point thereof adjacent said link-member pivot means, and a locking means for locking the gate in raised position and being operatively associated with said extension member and being anchored to said gate-supporting member intermediate said gate-pivot means and said link-member pivot means.

6. The combination substantially as set forth in claim 5, wherein said locking means includes a locking pin projecting from the extension member intermediate the gate-pivot means and the outer end of said extension member and a locking lever anchored at its lower end to said gate-supporting member intermediate said gate-pivot means and said link-member pivot means and inclining upwardly-outwardly so as normally to lean on said locking pin, the lever having a locking-pin receiving notch located to lockingly receive said locking pin responsively to the gate being raised to a predetermined raised position.

7. The combination substantially as set forth in claim 5, wherein the outer end of the extension member to which the spring means is connected is upwardly inclined thereby to increase the length of the spring means.

8. The combination substantially as set forth in claim 5, wherein the other of said spaced vertical members and the end of the gate adjacent thereto have coacting hold-down means thereon adapted normally to latch the gate closed against the force of the spring means tending to raise it.

9. The combination substantially as set forth in claim 5, wherein said hold-down means includes a latch bar rigidly affixed to and projecting from the other end of the gate top member and disposed forwardly of said other spaced vertical member, and a downwardly opening keeper hook carried by said other spaced vertical member for receiving said latch bar and holding it and thereby the gate against unintentional raising movement.

10. The combination substantially as set forth in claim 5, wherein the other of said spaced vertical members and the ends of both the top and bottom members of the gate disposed adjacent thereto are provided with hold-down means thereon adapted to normally latch the gate closed against the force of the spring means tending to raise it, the hold-down means between said other vertical member and said bottom member of the gate being also adapted to position said bottom member laterally.

References Cited in the file of this patent

UNITED STATES PATENTS

| | | |
|---|---|---|
| 475,132 | Merridith | May 17, 1892 |
| 920,492 | Pritchard et al. | May 4, 1909 |
| 1,059,916 | Stevens | Apr. 22, 1913 |
| 1,226,213 | Hill | May 15, 1917 |
| 1,329,022 | Schneider | Jan. 27, 1920 |
| 2,529,386 | Guth et al. | Nov. 7, 1950 |
| 2,563,894 | White | Aug. 14, 1951 |
| 2,713,737 | Hawkins | July 26, 1955 |